United States Patent Office 2,748,120
Patented May 29, 1956

---

2,748,120

2-AMINO-6-ARYL-5,6-DIHYDRO-4-HYDROXY-PYRIMIDINES

Robert R. Burtner, Skokie, Ill., assignor, by mesne assignments, to G. D. Searle & Co., Skokie, Ill., a corporation of Delaware No Drawing. Application June 17, 1954, Serial No. 437,560

11 Claims. (Cl. 260—256.4)

This invention relates to 2-amino-6-aryl-5,6-dihydro-4-hydroxypyrimidines and processes for the manufacture thereof. More particularly, this invention relates to compounds of the formula

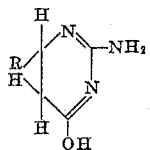

wherein R is a univalent radical derived from a mononuclear aromatic hydrocarbon by the removal of one atom of hydrogen. The aryl radical thus specified may be substituted or not substituted, as hereinafter illustrated, suitable substituent groupings including alkoxyl, hydroxyl, and halogen radicals, either singly or in combination. Examples of the aryl radicals comprehended by R in the formula above are

Phenyl

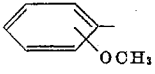

Methoxyphenyl

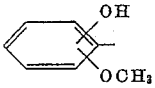

Hydroxymethoxyphenyl

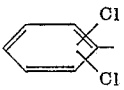

Dichlorophenyl

Equivalent to the basic pyrimidines of this invention and likewise adapted to its uses are the non-toxic acid addition salts formed by interaction of the claimed compounds with inorganic and strong organic acids. Representative of such salts are compositions of the formula

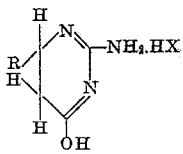

wherein R is defined as above and X is one equivalent of an anion—for example, chloride, bromide, iodide, methyl sulfate, ethyl sulfate, benzenesulfonate, toluenesulfonate, tartrate, succinate, malate, acetate, citrate, nitrate, sulfate, phosphate, sulfamate, and the like—which in combination with the cationic portion of a salt aforesaid is neither pharmacologically nor otherwise undesirable in pharmaceutical dosage.

The compounds of this invention are useful in medicine for the treatment of disease and the relief of conditions inimical to the well-being of the animal body. For example, they are diuretics, being capable of augmenting both urine volume and sodium excretion, thus producing a significant loss of body weight and decreased dyspnea in cases of edema associated with congestive cardiac failure, renal disease, cirrhosis of the liver, and other common pathologic states. Moreover, the subject compounds manifest their activity upon oral administration, a property of particular value in the field of their intended use.

The amine bases which comprise this invention are relatively insoluble in water and in most of the common organic solvents, but may be taken up in warm, dilute acids. The acid addition salts thus produced are moderately soluble in water and, to a lesser extent, in those organic solvents miscible therewith. The subject compounds may be administered in solid form as tablets; dissolved or suspended in aqueous media, they may be given parenterally.

The compounds to which this invention relates are conveniently prepared by reacting guanidine with an ester of the formula

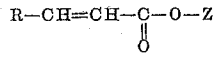

wherein R has the meaning assigned above and Z is a lower alkyl radical. The reaction is ordinarily carried out in the presence of a solvent—for example, a lower alcohol—chief consideration in the selection of which is ability to solubilize the reactants. (Methyl alcohol, ethyl alcohol, benzene, ether and dioxane have all proven satisfactory in condensations of the type herein disclosed.) Temperatures at which the reaction proceeds are not critical, although heating from 65° to 120° centigrade is a preferred operation. The ester intermediates used in synthesis of the instant compounds are in part obtained from commercial sources, others being derived by means of the Perkin reaction, wherein an appropriate aromatic aldehyde is heated with the anhydride of a selected aliphatic acid and the sodium or potassium salt of the same acid. The acids thus obtained are, in turn, esterified by conventional means—for example, using the Fischer-Speier method wherein the acid and a lower alcohol such as methyl or ethyl alcohol are reacted in the presence of a trace of mineral acid to form an ester.

The following examples will illustrate in detail certain of the pyrimidine derivatives which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), and relative amounts of materials in parts by weight, except as otherwise noted.

Example 1

2 - amino - 5,6 - dihydro - 4 - hydroxy - 6 - phenylpyrimidine.—To a solution of 11 parts of sodium in 315 parts of absolute alcohol is added a hot solution of 46 parts of guanidine hydrochloride in 160 parts of absolute alcohol. After 5 minutes, the sodium chloride which precipitates is filtered out and then washed with approximately 80 parts of absolute alcohol. Filtrate and washings are combined and approximately 65 parts of methyl cinnamate is incorporated therewith. This mixture is heated at reflux temperatures for 20 hours. A white precipitate forms in process, increasing in volume as the reaction progresses. Following the heating period, the reaction mixture is cooled and the white precipitate then filtered therefrom. The precipitate is first washed with a small amount of absolute alcohol, then triturated with approximately 100 parts of 5% aqueous caustic soda. Separated by filtration, rinsed with a small amount of water, and dried at approximately 75° C., in that order, the precipitate shows M. P. approximately 266° C. The product thus obtained—2-amino-5,6-dihydro-4-hydroxy-6-phenylpyrimidine—is converted to the hydrochloride by dissolution in a mixture of 19 parts of muriatic acid and 84 parts of water at about 75° C. The base is reprecipitated by addition of sufficient 20% aqueous sodium carbonate to render the solution of the acid addition salt alkaline to litmus. The reprecipitated base is rinsed well with hot water and then washed by suspension in approximately 16 parts of boiling methyl alcohol. The product may be recrystallized from approximately 100 volumes of methyl alcohol to give tiny white crystals, M. P. approximately 267° C. (with decomposition). 2-amino-5,6 - dihydro - 4 - hydroxy - 6 - phenylpyrimidine has the formula

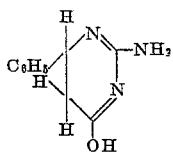

Example 2

2 - amino - 5,6 - dihydro - 4 - hydroxy - 6 - (p-methoxyphenyl) - pyrimidine.—A solution of 11 parts of sodium in 315 parts of alcohol—the alcohol being specially dried in accordance with the techniques disclosed in J. Amer. Chem. Soc., 53, 1106 (1931)—is prepared by heating at reflux temperatures for approximately 3 hours. To this solution, cooled to room temperature or slightly below, is added a cooled solution of approximately 46 parts of guanidine hydrochloride in 160 parts of specially dried alcohol. The reactants are thoroughly agitated for a few minutes, following which the sodium chloride precipitated is removed by filtration. To the filtrate is added 82 parts of ethyl p-methoxycinnamate, and the resultant mixture is heated at reflux temperatures for 24 hours. A granular white precipitate forms in process. The precipitate is filtered from the boiling reaction mixture, rinsed with a little alcohol, and dried at 75° C., in that order. The product thus obtained—2-amino-5,6-dihydro-4-hydroxy-6-(p-methoxyphenyl)-pyrimidine—is purified through the hydrochloric acid addition salt, which is obtained by dissolution of the base in approximately 1200 parts of water containing 48 parts of muriatic acid, at the boiling point. Upon addition of sufficient concentrated aqueous potassium carbonate to render the solution alkaline to litmus, the purified base is reprecipitated. The precipitated base is filtered from the hot mother liquor, rinsed with water, and then dried at 75° C. The desired product is thus obtained as a granular white powder, M. P. approximately 285° C. (with decomposition). It has the formula

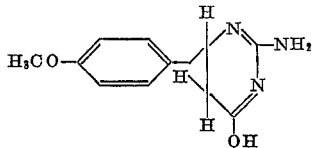

Example 3

2 - amino - 5,6 - dihydro - 4 - hydroxy - 6 - (4 - hydroxy-3-methoxyphenyl)-pyrimidine.—From 46 parts of guanidine hydrochloride, the corresponding base is prepared in accordance with the technique detailed in Examples 1 and 2, using 11 parts of sodium and a total of 315 parts of absolute alcohol. Solvent is removed by distillation at temperatures up to 60° C. and to the residue is then added at approximately 75° C., 102 parts of methyl ferulate. Heat is evolved and the reaction mixture becomes dark red in color. The mixture is stored overnight at room temperature. A clear, solid "glass" of pale yellow color results. Approximately 200 parts of water is added and the materials then let stand 24 hours longer, with occasional agitation. The "glass" is converted in process to a yellow granular solid. This solid is dissolved in approximately 400 parts of 5% aqueous caustic soda by trituration and the addition of a further quantity (approximately 600 parts) of water. The alkaline solution is acidified to Congo red with muriatic acid, precipitating an oil. The oil and water mixture is extracted twice with ether (from the ether extracts ferulic acid is recovered, M. P. 170–171° C.), following which the aqueous phase, now free of oil, is stripped of residual ether by aeration. The material is made alkaline to litmus with sodium bicarbonate, causing a gelatinous yellow precipitate to form. The product thus obtained—2-amino-5,6-dihydro-4-hydroxy-6-(4-hydroxy - 3 - methoxyphenyl) - pyrimidine—is converted to the corresponding hydrochloric acid addition salt by dissolution in approximately 6 volumes of a 1:4 (v./v.) aqueous muriatic acid solution, at the boiling point. This solution is treated with decolorizing charcoal and filtered hot. On cooling, golden needles of 2-amino-5,6-dihydro-4-hydroxy-6-(4-hydroxy-3-methoxy - phenyl)-pyrimidine hydrochloride precipitate. Filtered out and dried at 75° C., the salt is converted to an amorphous yellow powder. It is taken up in 80 parts of hot water and the resultant solution then made alkaline by the addition of 14 parts of potassium carbonate in concentrated aqueous solution. Precipitation occurs. The mixture is digested briefly at around 75° C. to coagulate the yellow precipitate. The precipitate thus obtained is isolated by filtration and then washed with copious quantities of hot water. The 2-amino-5,6-dihydro-4-hydroxy-6-(4-hydroxy-3-methoxyphenyl)-pyrimidine so prepared shows M. P. approximately 230° C. (with decomposition). It has the structural formula

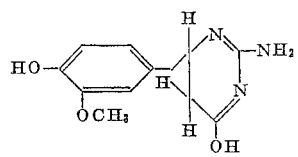

Example 4

2-amino-6-(3,4-dichlorophenyl)-5,6-dihydro-4-hydroxypyrimidine.—A solution of approximately 46 parts of guanidine hydrochloride in 160 parts of absolute alcohol is added to a solution of 11 parts of sodium in 315 parts of absolute alcohol. After removal of the precipitated sodium chloride by filtration, 98 parts of ethyl 3,4-dichlorocinnamate is introduced; and the resultant mixture is heated with agitation at reflux temperatures for approximately 22 hours. The white granular precipitate which forms in process is filtered from the hot reaction mixture, rinsed with alcohol, and dissolved in 500 parts of water containing 19 parts of muriatic acid, in that order. Addition of excess potassium carbonate precipitates the desired 2-amino-6-(3,4-dichlorophenyl)-5,6-dihydro-4-hydroxypyrimidine as a white, granular solid which, after thorough washing with water and subsequent drying, shows M. P. approximately 275° C. (with decomposition). The product has the formula

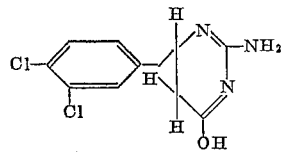

I claim:
1. A compound of the formula

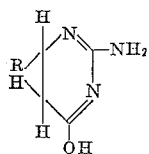

wherein R is selected from the group consisting of phenyl, methoxyphenyl, hydroxymethoxyphenyl, and dichlorophenyl radicals.
2. 2-amino-5,6-dihydro-4-hydroxy-6-phenylpyrimidine.
3. A compound of the formula

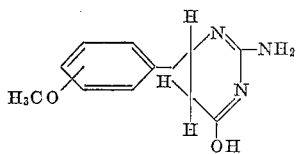

4. 2-amino-5,6-dihydro-4-hydroxy-6-(p-methoxyphenyl)-pyrimidine.
5. A compound of the formula

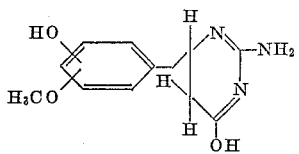

6. 2-amino-5,6-dihydro-4-hydroxy-6-(4-hydroxy-3-methoxyphenyl)-pyrimidine.

7. A compound of the formula

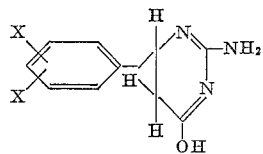

wherein X is chlorine.
8. 2-amino-6-(3,4-dichlorophenyl)-5,6-dihydro-4-hydroxypyrimidine.
9. In a process for the manufacture of compounds of the formula

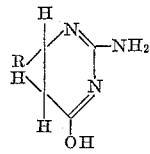

wherein R is selected from the group consisting of phenyl, methoxyphenyl, hydroxymethoxyphenyl, and dichlorophenyl radicals, the step which comprises reacting guanidine with an ester of the formula

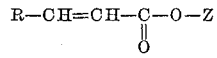

wherein R is defined as above and Z is a lower alkyl radical.
10. The process of claim 9 wherein the process is carried out in the presence of a solvent.
11. The process of claim 10 wherein the solvent is absolute alcohol.

No references cited.